United States Patent
Adachi et al.

(10) Patent No.: US 9,623,815 B2
(45) Date of Patent: Apr. 18, 2017

(54) WIRE HARNESS WITH EXTERIOR MEMBER

(71) Applicant: Yazaki Corporation, Tokyo (JP)

(72) Inventors: Hideomi Adachi, Kosai (JP); Yoshiaki Ozaki, Kosai (JP)

(73) Assignee: Yazaki Corporation, Minato-ku, Tokyo (JP)

(*) Notice: Subject to any disclaimer, the term of this patent is extended or adjusted under 35 U.S.C. 154(b) by 0 days.

(21) Appl. No.: 14/280,748

(22) Filed: May 19, 2014

(65) Prior Publication Data

US 2014/0251681 A1 Sep. 11, 2014

Related U.S. Application Data

(63) Continuation of application No. PCT/JP2012/080808, filed on Nov. 21, 2012.

(30) Foreign Application Priority Data

Nov. 25, 2011 (JP) ................... 2011-257416

(51) Int. Cl.
*B60R 16/02* (2006.01)
*B29C 63/42* (2006.01)
*H02G 3/04* (2006.01)
*H01B 7/00* (2006.01)
*H01B 13/00* (2006.01)
(Continued)

(52) U.S. Cl.
CPC .......... *B60R 16/0215* (2013.01); *B29C 63/42* (2013.01); *B60R 16/0207* (2013.01); *H02G 3/0481* (2013.01)

(58) Field of Classification Search
CPC .... H01B 13/012; B60R 16/0215; H01R 13/56
USPC ... 174/72 A, 36, 105 R, 106 R, 109, 105 SC
See application file for complete search history.

(56) References Cited

U.S. PATENT DOCUMENTS 3,898,369 A * 8/1975 Clabburn ............ B29C 61/0616
138/145
4,554,422 A * 11/1985 Embrey .................. F16H 59/70
200/61.88
(Continued)

FOREIGN PATENT DOCUMENTS

JP 9-161546 A 6/1997
JP H09-161546 * 6/1997
(Continued)

OTHER PUBLICATIONS

Heat-Shrink Tubing: The Versatile Tools for Maintenance and Repair. Alpha Wire publication Sep. 17, 2010.*
(Continued)

*Primary Examiner* — Michael F McAllister
(74) *Attorney, Agent, or Firm* — Sughrue Mion, PLLC (57) ABSTRACT

A wire harness includes one or more conducting paths, and a pipe-like exterior member which accommodates the one or more conducting paths. The exterior member is formed of a shrinkable tube having a bent part formed in conformity with a wiring path of the one or more conducting paths during a shrink of the shrinkable tube, and the bent part maintains a shape of the wiring path of the one or more conducting paths after the shrink of the shrinkable tube.

5 Claims, 7 Drawing Sheets

(51) Int. Cl.
*H05K 7/00* (2006.01)
*H05K 13/06* (2006.01)

(56) References Cited

U.S. PATENT DOCUMENTS

| | | | | |
|---|---|---|---|---|
| 4,766,267 A | * | 8/1988 | Gray | B29C 61/0616 |
| | | | | 174/359 |
| 4,896,000 A | * | 1/1990 | Procter | H01R 4/64 |
| | | | | 174/360 |
| 5,091,604 A | * | 2/1992 | Kirma | H02G 3/0666 |
| | | | | 174/2 |
| 5,098,753 A | * | 3/1992 | Gregory | H01R 4/726 |
| | | | | 174/36 |
| 5,571,992 A | * | 11/1996 | Maleski | H01B 11/10 |
| | | | | 174/105 R |
| 6,156,973 A | | 12/2000 | Ushiyama et al. | |
| 7,102,077 B2 | * | 9/2006 | Aisenbrey | H05K 9/0098 |
| | | | | 174/36 |
| 7,255,602 B1 | | 8/2007 | Driessen et al. | |
| 2002/0155738 A1 | * | 10/2002 | Ohsawa | B60Q 1/0088 |
| | | | | 439/98 |
| 2005/0011687 A1 | | 1/2005 | Yamaguchi et al. | |
| 2010/0038011 A1 | | 2/2010 | Yoshinaga | |
| 2010/0319956 A1 | | 12/2010 | Ballard et al. | |

FOREIGN PATENT DOCUMENTS

| | | |
|---|---|---|
| JP | 2004-224156 A | 8/2004 |
| JP | 201045948 A | 2/2010 |

OTHER PUBLICATIONS

Glenair QwikConnect Jul. 2011, vol. 15 No. 3.*
Alpha Wire Understanding Shielded Cable © 2009 Alpha Wire. All rights reserved.*
International Search Report (PCT/ISA/210), dated Mar. 5, 2013, issued by the International Searching Authority in counterpart International Patent Application No. PCT/JP2012/080808.
Written Opinion (PCT/ISA/237), dated Mar. 5, 2013, issued by the International Searching Authority in counterpart International Patent Application No. PCT/JP2012/080808.
Communication issued on Oct. 5, 2015 by the European Patent Office in related Application No. 12816366.4.
Office Action dated Oct. 16, 2015, issued by the Japanese Intellectual Property Office in counterpart Japanese Application No. 2011-257416.
Communication issued on May 25, 2016 by the European Patent Office in related Application No. 12816366.4.
Office Action dated Jul. 15, 2015 issued by the State Intellectual Property Office of the People's Republic of China in counterpart Chinese Patent Application No. 201280058106.6.

* cited by examiner

WIRE HARNESS WITH EXTERIOR MEMBER

CROSS REFERENCE TO RELATED APPLICATIONS

This application is a continuation of PCT application No. PCT/JP2012/080808, which was filed on Nov. 21, 2012 based on Japanese Patent Application (No. 2011-257416) filed on Nov. 25, 2011, the contents of which are incorporated herein by reference.

BACKGROUND OF THE INVENTION

1. Field of the Invention

The present invention relates to a wire harness which includes one or more conducting paths, and a pipe-like exterior member which accommodates the conducting paths.

2. Description of the Related Art

The wire harness disclosed in JP-A-2004-224156 includes three high voltage electric wires, and three metal protecting pipes for accommodating and protecting the three high voltage electric wires, respectively. The high voltage electric wires are included to connect a motor that is mounted in the front of a vehicle and an inverter which is mounted in the middle of the vehicle or at the back side of the vehicle.

The wire harness is adapted to be wired through a vehicle body floor which is outside a vehicle body frame. Therefore, the metal protecting pipe is formed so that the high voltage electric wires can be protected from a stone splash and a water splash. The metal protecting pipe protects the high voltage electric wire from a stone splash and a water splash, and has rigidity to prevent the bending of the high voltage electric wire, and also has an electromagnetic shielding function because the metal protecting pipe is made of metal.

The wire harness is manufactured by inserting the high voltage electric wires into the metal protecting pipes which are in a straight state, and after having performed the insertion respectively, bending the metal protecting pipes along the wiring path of the wire harness under the vehicle body floor. After the wire harness is manufactured as above in a factory of the harness manufacturer, the wire harness is conveyed to an assembly plant of the vehicle manufacturer and is assembled to a predetermined position of a vehicle, and thereby the wiring is completed.

SUMMARY OF THE INVENTION

In the above related technique, there is a problem that, to prevent the metal protecting pipes from contacting with each other or deforming when the wire harness is conveyed, it is necessary to secure an enough space for each of the metal protecting pipes and for each wire harness. Further, because the metal protecting pipe is bent three-dimensionally, there is a problem that it is necessary to secure a three-dimensional space.

In order to solve the above problems, it is considered to replace the metal protecting pipes with bendable pipes. However, if merely the above bendable pipe is used a substitute member, it is difficult to solve the following problems.

That is, in case of a pipe which is only bendable, it is difficult to maintain a desired shape when the wire harness is assembled or wired and after the wire harness is wired. Further, if it is difficult to maintain a desired shape, it is necessary to add, for example, a protector when the pipe is assembled to a predetermined position of the vehicle. However, because the protector is a member which is resin molded in accordance with the wiring path, there are problems that the protector becomes an exclusive member which is exclusively designed for each vehicle, and that the versatility becomes low and the cost becomes high.

Regarding the protector, because trial metal molds may be made many times in a developing stage, there is a problem that design expense, metal mold expense, design time and the like are required. Further, regarding the protector, because the portion that is assembled to the pipe is capsized, there is a problem that a trouble that the ground is approached is produced.

Because various operations such as rust prevention, coating, and painting with a predetermined color which indicates high voltage must be performed for the metal protecting pipe of the related technique, there is a problem that the cost is increased in these aspects. Further, when the metal protecting pipe is bent with a vendor device or the like, the pipe may be crushed, and there is a problem that the inside high voltage electric wires may be pressed and damaged when the pipe is temporarily crushed.

The present invention is made in view of the above described circumstances, and an object of the present invention is to provide a wire harness so that while it is possible to bend the wire harness and a desired shape can be maintained, the cost can be lowered without complicating the structure of a protector.

A first aspect of the present invention provides a wire harness, including: one or more conducting paths; and a pipe-like exterior member which accommodates the one or more conducting paths, wherein the exterior member is formed of a shrinkable tube having a bent part formed in conformity with a wiring path of the one or more conducting paths during a shrink of the shrinkable tube, and the bent part maintains a shape of the wiring path of the one or more conducting paths after the shrink of the shrinkable tube.

According to the first aspect having such a feature, the wire harness includes one or more conducting paths, and an exterior member which is formed of a shrinkable tube. In the exterior member which is formed of the shrinkable tube, the bent part which conform to the wiring path is formed during the shrink of the shrinkable tube. After the bent part is formed, the wire harness is maintained in a desire shape of the wiring path. That is, the wire harness is maintained in a desire shape of the wiring path by the exterior member formed of the shrinkable tube.

A second aspect of the present invention provides a wire harness according to the first aspect, wherein the exterior member which is formed of the shrinkable tube has a conductivity to serve as a shielding member.

According to the second aspect having such a feature, the exterior member formed of the shrinkable tube has conductivity. The exterior member having conductivity functions as a shielding member. That is, it is not necessary to include a shielding member separately in the construction of the wire harness.

A third aspect of the present invention provides a wire harness according to the first or second aspect, further including a connecting member which is provided at a terminal position of the one or more conducting paths, wherein the shrinkable tube has a watertight part which adhere on an outer surface of the connecting member with the shrink of the shrinkable tube.

According to the third aspect having such a feature, the wire harness includes one or more conducting paths, an exterior member which is formed of a shrinkable tube, and a connecting member. In the exterior member which is formed of the shrinkable tube, a watertight part is formed at a predetermined portion of the connecting member with the shrink of the shrinkable tube. The watertight part regulates the invasion of water to the inside part of the connecting member by adhering onto the outer surface of the connecting member. According to the configuration, it is not necessary to include watertight members (for example, rubber stoppers) separately in the construction of the wire harness. The terminal part of the exterior member formed of the shrinkable tube function as watertight part.

According to the first aspect of the present invention, because the shrinkable tube is used as the exterior member, effects are achieved that it becomes possible to bend before the shrinkable tube shrinks, and that the desired wiring path can be maintained after the shrink. Further, according to the first aspect, because the shrinkable tube is used as the exterior member, effects are achieved that the wiring path can be maintained and protection can be made without complicating the structure of a protector, and that the cost can be lowered.

According to second aspect of the present invention, the following effect is achieved in addition to the effects of the first aspect. That is, because the exterior member functions as a shielding member, an effect is achieved that the cost can be lowered by suppressing the increase of the number of components concerning the electromagnetic shielding.

According to the third aspect of the present invention, the following effects are achieved in addition to the effects of the first and second aspects. That is, because at the terminals of the exterior member there are the watertight parts which adhere onto the outer surfaces of the connecting members, an effect is achieved that the cost can be lowered by suppressing the increase of the number of components concerning the watertight structure.

DETAILED DESCRIPTION OF THE EXEMPLARY EMBODIMENTS

A wire harness includes one or more conducting paths, and an exterior member which is formed of a shrinkable tube.

Embodiment 1

Figure 1:
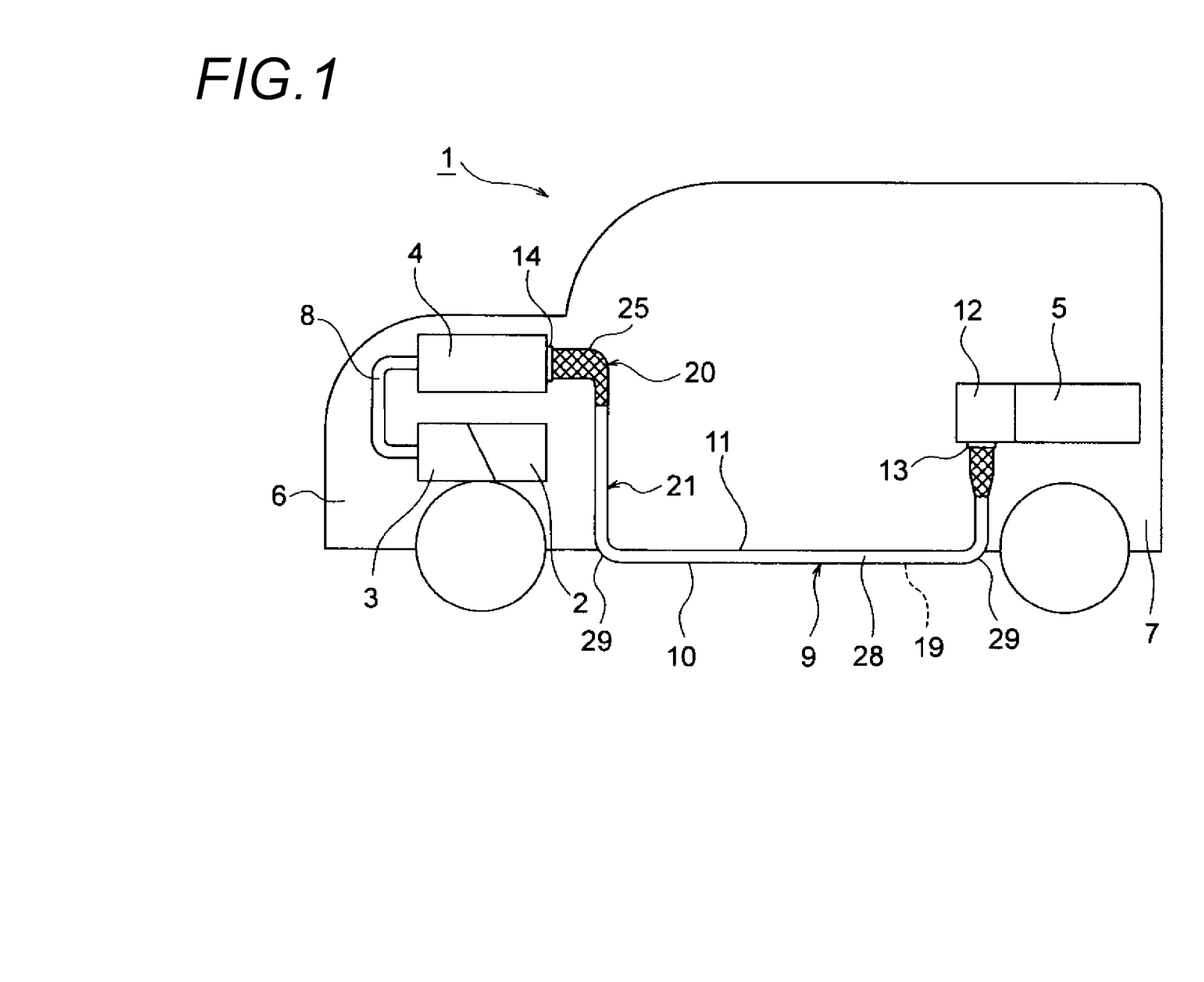
FIG. 1 is a schematic view of a vehicle which shows an example of wiring of a wire harness according to an embodiment 1 of the present invention.
Figure 2:
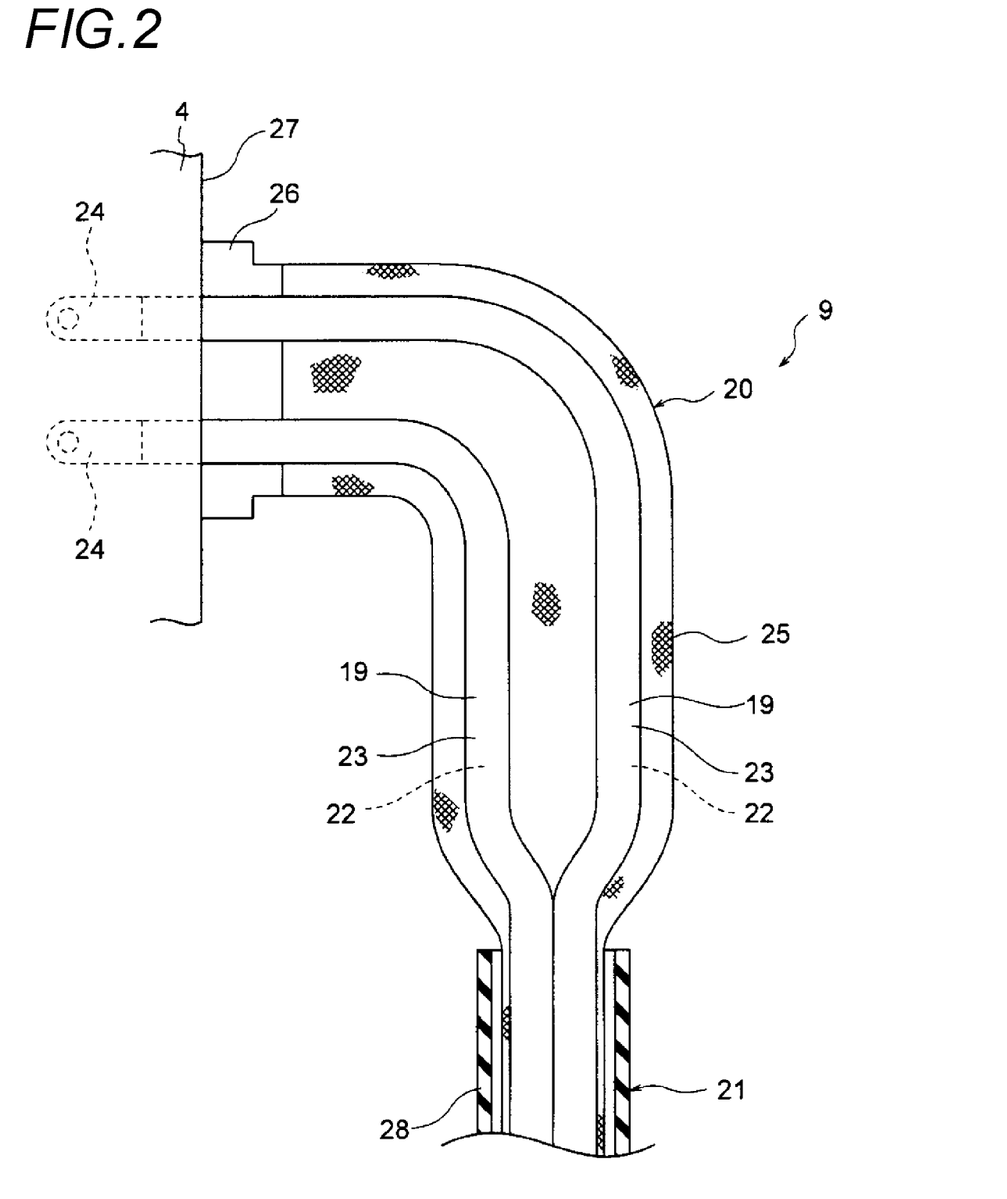
FIG. 2 is a schematic sectional view which shows one end side of the wire harness in FIG. 1.
Figure 3:
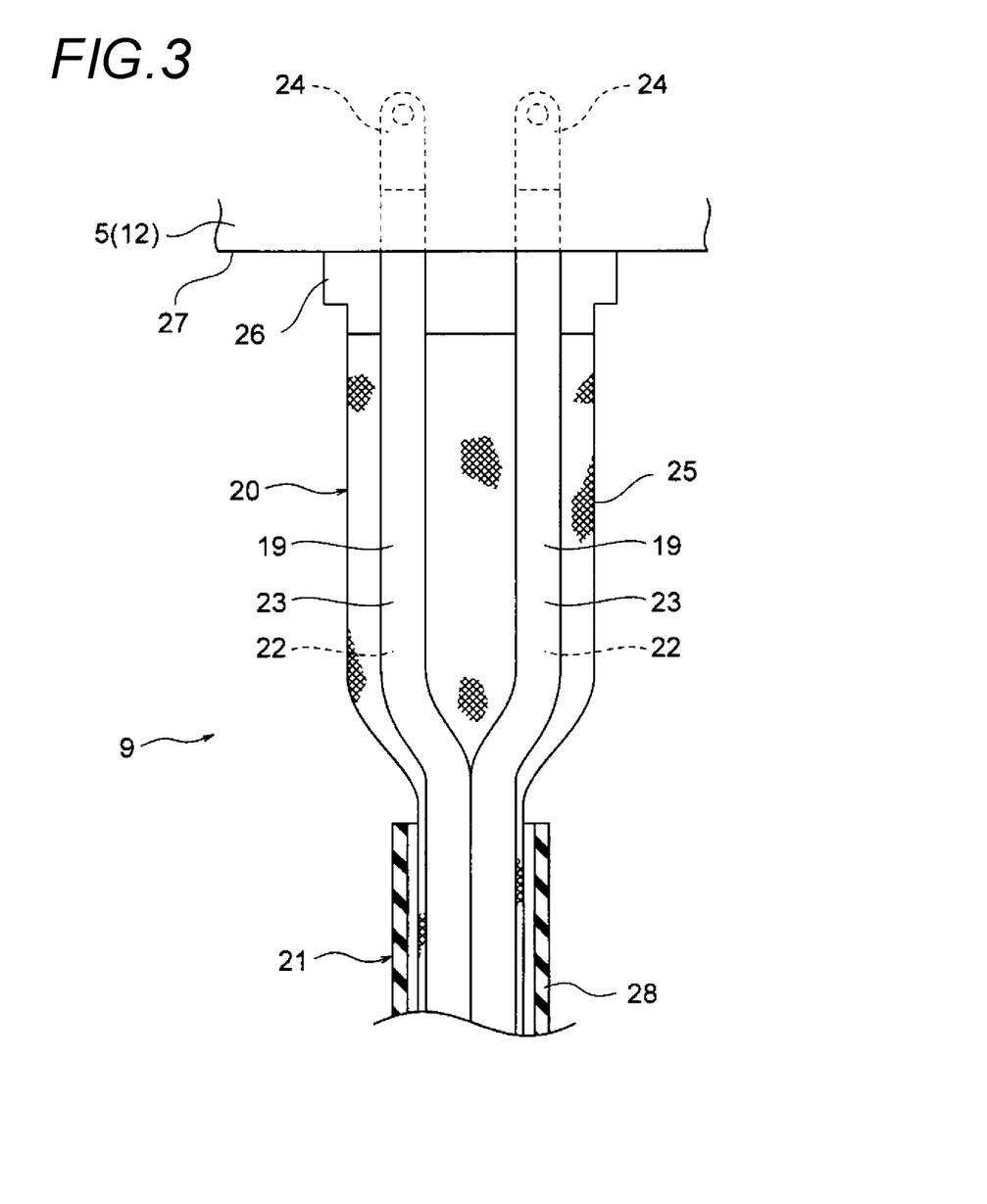
FIG. 3 is a schematic sectional view which shows the other end side of the wire harness in FIG. 1.
Figure 4A:
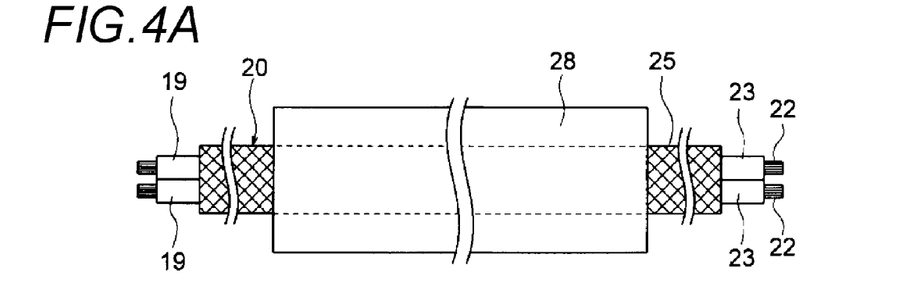
FIGS. 4A to 4C are illustrative figures related to the manufacture of the wire harness in FIG. 1.
Figure 4B:
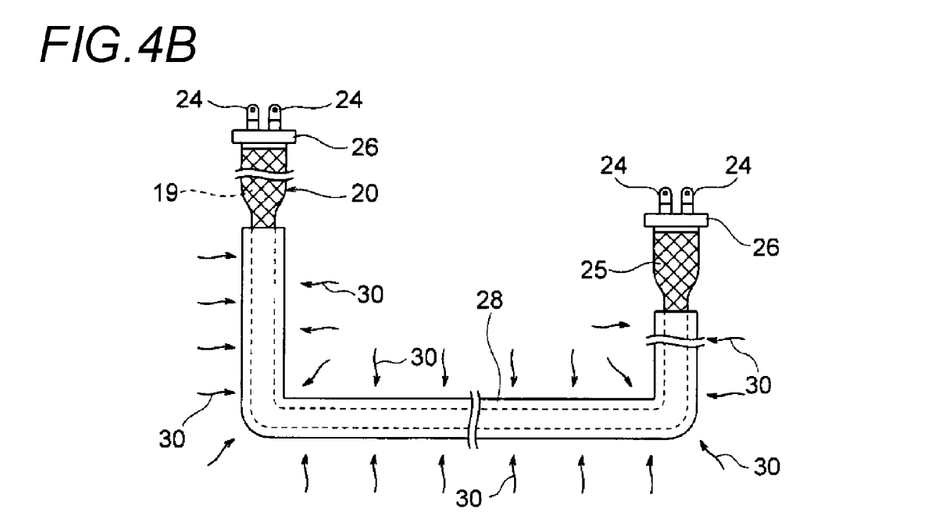
Figure 4C:
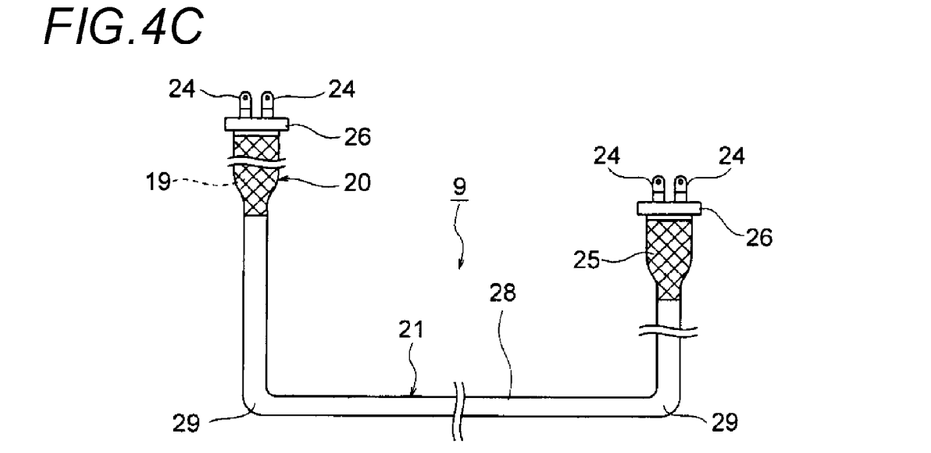

Next, an embodiment 1 is described with reference to the figures. FIG. 1 is a schematic view of a vehicle which shows an example of the wiring of a wire harness according to the embodiment 1 of the present invention. FIG. 2 is a schematic sectional view which shows one end side of the wire harness, FIG. 3 is a schematic sectional view which shows the other end side of the wire harness, and FIGS. 4A to 4C are illustrative figures related to the manufacture of the wire harness.

In the embodiment, an example in which a wire harness is applied to a hybrid vehicle (or an electric vehicle) is given and described.

In FIG. 1, a reference number 1 shows a hybrid vehicle. The hybrid vehicle 1 is a vehicle which is driven by mixing two powers of an engine 2 and a motor unit 3, and the electric power from a battery 5 (battery pack) will be supplied to the motor unit 3 via an inverter unit 4. The engine 2, the motor unit 3 and the inverter unit 4 are mounted in an engine room 6 at the position of front wheels and the like in the embodiment. The battery 5 is mounted in a vehicle rear part 7 of rear wheels and the like. The battery 5 may be mounted in an indoor space which exists behind the engine room 6.

The motor unit 3 and the inverter unit 4 are connected by a high voltage wire harness 8. The battery 5 and the inverter unit 4 are also connected by a high voltage wire harness 9. The wire harness 9 is constructed as a high voltage one. A middle part 10 of the wire harness 9 is wired at the ground side of a vehicle body floor 11. The wire harness 9 is wired generally in parallel with the vehicle body floor 11. The vehicle body floor 11 is a well-known body and is a so-called panel member, and through holes (their reference numbers are omitted.) are formed at predetermined positions. The wire harness 9 is inserted through these through holes.

The wire harness 9 and the battery 5 are connected through a junction block 12 which the battery 5 is provided with. A back end 13 of the wire harness 9 is electrically connected to the junction block 12 by a well-known method. A front end 14 of the wire harness 9 is electrically connected to the inverter unit 4 by a well-known method.

The motor unit 3 includes a motor and a generator in construction. The inverter unit 4 includes an inverter and a converter in construction. The motor unit 3 is formed as a motor assembly including a shielding case. The inverter unit 4 also is formed as an inverter assembly including a shielding case. The battery 5 is a Ni-MH battery or Li-ion battery, and is modularized. An electricity accumulating device such as a capacitor may be used. The battery 5 shall not be particularly limited as long as the battery 5 may be used for the hybrid vehicle 1 or an electric vehicle.

The embodiment of the present invention is described as follows by using the wire harness 9 as an example. The present invention can be applied to not only the wire harness 9, but also the wire harness 8.

The wire harness 9 is used to electrically connect the inverter unit 4 to the battery 5, and includes two high voltage electric wires 19 (conducting paths), a shielding member 20 which collectively covers and shields the two high voltage electric wires 19, and an exterior member 21 which is provided outside the shielding member 20.

In the following description, the side that is near the inverter unit 4 is referred to as one end. Further, the side that is near the battery 5 is referred to as the other end.

First, the above components are described.

In FIGS. 2 and 3, the high voltage electric wire 19 is a high voltage conducting path including a conductor 22 (refer to FIG. 4) and an insulator 23 (coating), and is formed to have a length that is necessary for electrical connection. The conductor is made of copper, copper alloy, aluminum or aluminum alloy. The conductor may be either a conductor structure in which strands are twisted or a rod-like conductor structure whose cross section is a rectangular shape or a round shape (for example, a conductor structure with a rectangular single core or a round single core, and in this case, the electric wire itself becomes rod-like).

The high voltage electric wires 19 are used in the present embodiment, but the invention shall not be limited to this. That is, it is also possible to provide an insulator to a well-known bus bar to be used as a high voltage conducting path, or to use a high voltage coaxial combined conducting path which is constructed by coaxially combining n sets of circuits (n circuits) to one.

As an example of the high voltage coaxial combined conducting path, a conducting path includes one of a positive electrode conductor and a negative electrode conductor, a first insulator which is provided to cover the outside of the one conductor, the other of the positive electrode conductor and the negative electrode conductor which is provided to cover the outside of the first insulator, and a second insulator which is provided to cover the outside of the other conductor, and is constructed by combining all of the above conductors and insulators into one.

A predetermined length of the insulator 23 at each of the one end and the other end of the high voltage electric wire 19 is removed. From this removed portion, the conductor 22 (refer to FIG. 4) is exposed. A terminal metal fitting 24 is connected to the exposed conductor 22. The terminal metal fitting 24 is provided as a part connected to a connecting part, which is not shown, of the inverter unit 4, or as a part connected to a connecting part, which is not shown, of the battery 5 (junction block 12).

A braid 25 is used as the shielding member 20 in the embodiment. The braid 25 is formed as a pipe-like electromagnetic shielding member (a shielding member for electromagnetic wave measures). The braid 25 is formed to have such a size that the full length of the two high voltage electric wires 19 can be roughly covered. The braid 25 is formed by using a lot of extra-fine strands that have conductivity, and knitting these strands into a pipe-like shape.

The above strand may be an extra-fine strand including a metal strand such as an annealed copper strand, or a nonmetal fiber. The nonmetal fiber may be a conductive resin fiber in which conductive material is mixed with carbonaceous fiber or resin material. Other than these strands, for example, a resin strand (PET strand) may be mixed to possess abrasion resistance.

Besides the braid 25, a metal foil alone, a film-like or sheet-like article including a metal foil or the like may be used as the shielding member 20. The shielding member 20 is not particularly limited as long as the shielding member 20 has an electromagnetic shielding function and has flexibility.

One end and the other end of the braid 25 are provided with shield shells 26. The shield shells 26 in use are well-known, and are formed so that they can be connected and fixed to shielding cases 27 of the inverter unit 4 and the battery 5. The shield shells 26 and the one end and the other end of the braid 25 are connected and fixed by adopting a method of crimping well-known shield rings (as an example).

In FIGS. 1 to 3, the exterior member 21 is formed of a shrinkable tube 28, and when the shrinkable tube 28 shrinks, bent parts 29 which conform to the wiring path of the wire harness 9 are formed. By forming the bent parts 29, the exterior member 21 makes it possible to maintain the shape of the above wiring path.

The shrinkable tube 28 is formed into a straight pipe shape before the shrink. The inside diameter of the shrinkable tube 28 is set so that the two high voltage electric wires 19 and the shielding member 20 can be easily inserted. The inside diameter of the shrinkable tube 28 after the shrink is set so that the two high voltage electric wires 19 and the shielding member 20 are not pressed.

In the embodiment, a heat shrinkable tube which shrinks when heat is applied is used as the shrinkable tube 28. However, the heat shrinkable tube is an example. That is, a tube which shrinks at room temperature may be used.

Ethylene propylene rubber (EPDM) is adopted as the material of the shrinkable tube 28 in the embodiment. As long as the function as an exterior member (protective member) can be secured, for example, polyolefin material, fluoric resin, silicone or the like may be adopted. As long as the function as an exterior member (protective member) can be secured, the thickness of the shrinkable tube shall not be particularly limited.

Regarding the material of the shrinkable tube 28, although described in other embodiments, conductive material may be mixed. That is, to obtain a heat shrinkable tube that has conductivity, conductive material may be adopted. In addition, in order to recognize that the wire harness 9 is a high voltage one, the material which can be colored to orange may be mixed.

Then, the manufacture of the wire harness 9 is described. The invention shall not be limited to operations described below.

In FIG. 4A, first, the two high voltage electric wires 19 are collectively covered with the shielding member 20 (braid 25), and the shielding member 20 is inserted into the shrinkable tube 28 before the shrink. The high voltage electric wires 19, the shielding member 20 and the shrinkable tube 28 before the shrink are machined to a predetermined length beforehand.

Then, as shown in FIG. 4B, the terminal metal fittings 24 or the shield shells 26 are provided to the one end and the other end of the high voltage electric wires 19 and the shielding member 20. This operation may be performed before the operation of inserting into the shrinkable tube 28 before the shrink.

Then, the wire harness 9 is conveyed to, for example, an assembly plant of the vehicle manufacturer, and then an operation of forming bent shapes which conform to the wiring path is performed near the hybrid vehicle 1 (refer to FIG. 1).

After the bent shapes which conform to the wiring path are formed, an operation of causing the shrinkable tube 28 to shrink is performed by applying heat 30 equally to the whole shrinkable tube 28 before the shrink. After the shrinkable tube 28 shrinks, the formation of the exterior member 21 is completed as shown in FIG. 4C, and the manufacture of the wire harness 9 is also completed. After the manufacture, the wiring is completed by assembling the wire harness 9 to a predetermined position of the hybrid vehicle 1 (refer to FIG. 1).

As described above with reference to FIGS. 1 to 4C, the wire harness 9 includes the two high voltage electric wires 19 as conducting paths, and the exterior member 21 which is formed of the shrinkable tube 28. In the exterior member 21, which is formed of the shrinkable tube 28, the bent parts 29 which conform to the wiring path are formed because of the shrink of the shrinkable tube 28. Thereby, the shape of the wiring path can be maintained.

Because the wire harness 9 uses the shrinkable tube 28 as the exterior member 21, it becomes possible to bend the wire harness 9 before the shrinkable tube 28 shrinks, and the desired wiring path can be maintained after the shrink.

By using the shrinkable tube 28 as the exterior member 21, the wiring path can be maintained and protection can be made without complicating the structure of a protector. Further, because it is not necessary to use a protector, the cost can be lowered.

It is needless to say that the operation of causing the shrinkable tube 28 to shrink is simpler than the operation of assembling a protector provided for maintaining the path.

Embodiment 2

Figure 5:
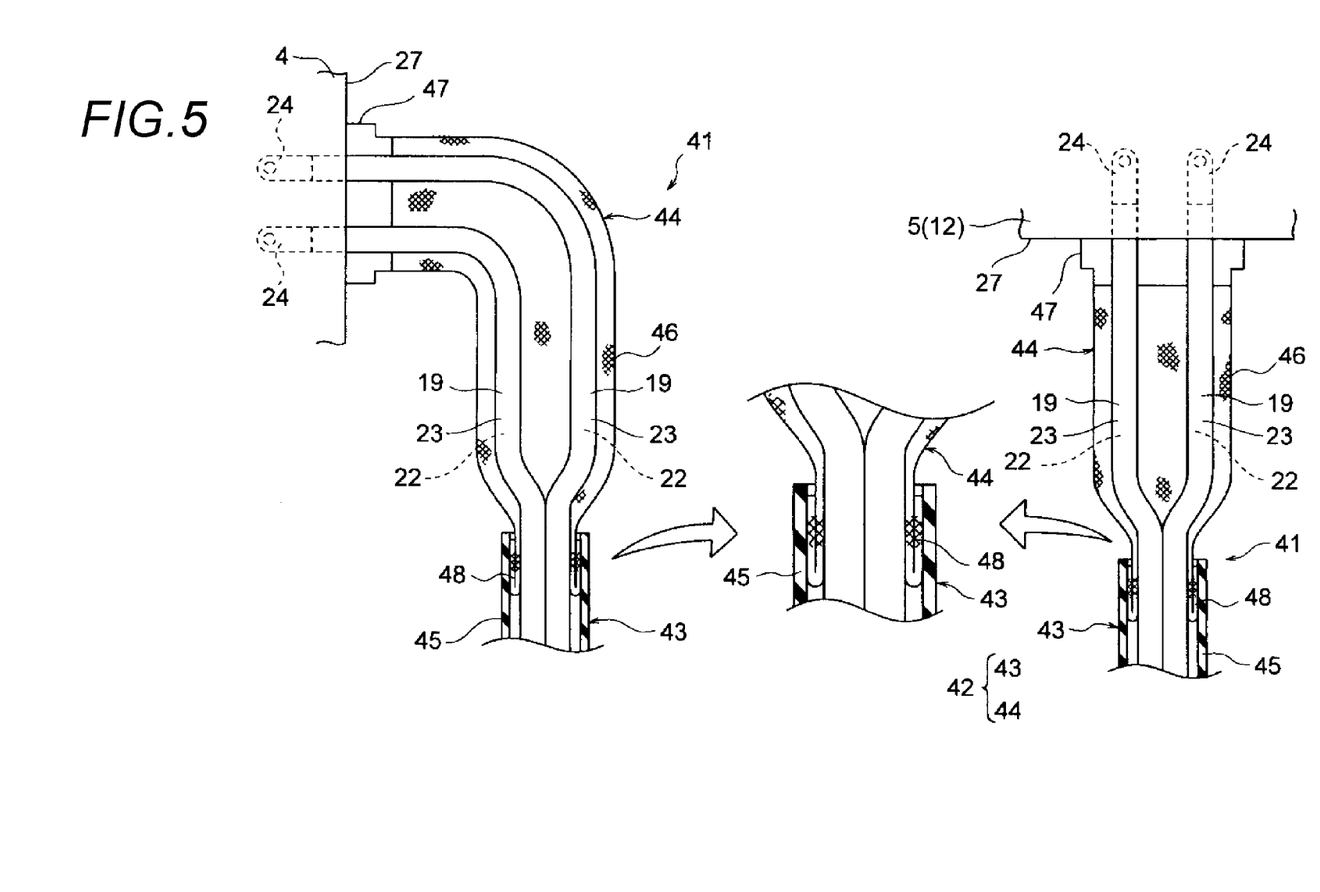
FIG. 5 is a schematic sectional view which shows another example of a wire harness according to an embodiment 2 of the present invention.

Next, an embodiment 2 is described with reference to the figures. FIG. 5 is a schematic sectional view which shows another example of the wire harness according to the embodiment 2 of the present invention. The components that are identical with those in the embodiment 1 are given identical numbers, and their detailed description is omitted.

In FIG. 5, the wire harness 41 is used to electrically connect the inverter unit 4 to the battery 5, and includes two high voltage electric wires 19 (conducting paths), and a shielding member 42 which covers and shields the two high voltage electric wires 19. The shielding member 42 includes an exterior shielding member 43 (exterior member and shielding member) and terminal shielding members 44 which are provided at one end and the other end of the exterior shielding member 43.

The exterior shielding member 43 is formed of a shrinkable tube which has conductivity, that is, a conductive shrinkable tube 45, and when the conductive shrinkable tube 45 shrinks, bent parts (refer to the bent parts 29 of the embodiment 1) which conform to the wiring path of the wire harness 41 are formed. When the bent parts are formed due to the shrink, the exterior shielding member 43 makes it possible to maintain the shape of the above wiring path.

The conductive shrinkable tube 45 is formed into a straight pipe shape before the shrink. The inside diameter of the conductive shrinkable tube 45 is set so that the two high voltage electric wires 19 and tube connecting parts 48 to be describe later of the terminal shielding members 44 can be easily inserted. The inside diameter of the conductive shrinkable tube 45 after the shrink is set so that the two high voltage electric wires 19 are not pressed. The inside diameter of the conductive shrinkable tube 45 after the shrink is set so that the conductive shrinkable tube 45 contacts with the tube connecting parts 48 to be described below and electrical connection is accomplished.

In the embodiment, a conductive heat shrinkable tube which shrinks when heat is applied is used as the conductive shrinkable tube 45. The conductive heat shrinkable tube is merely an example. A material in which conductive material is mixed with ethylene propylene rubber (EPDM) is adopted as the material in the embodiment. As long as the function as an exterior member (protective member) and the function as a shielding member can be secured even by mixing with conductive material, for example, polyolefin material, fluoric resin, silicone or the like may be adopted. In addition, in order to recognize that the wire harness 41 is a high voltage one, the material which can be colored to orange may be mixed. As long as the function as an exterior member (protective member) can be secured, the thickness of the conductive shrinkable tube 45 shall not be particularly limited.

Other than mixing with conductive material, the following processing is also effective in keeping conductivity. That is, it is also effective to perform vapor deposition plating on the inside surface of the heat shrinkable tube and attach a pipe-like metal foil onto the inside surface of the heat shrinkable tube.

The terminal shielding member 44 has a braid 46, a shield shell 47 which is provided at the device side of the braid 46, and a tube connecting part 48 which is provided at the side opposite to the shield shell 47.

The braid 46 is a pipe-like electromagnetic shielding member (besides the braid 46, a metal foil alone, a film-like or sheet-like article including a metal foil or the like may be used), and is formed to have such a size that the terminal portions of the two high voltage electric wires 19 can be covered. The braid 46 is formed by using a lot of extra-fine strands that have conductivity, and knitting these strands into a pipe-like shape.

The shield shells 47 in use are well-known, and are formed so that it is possible to be connected and fixed to shielding cases 27 of the inverter unit 4 and the battery 5. The shield shell 47 and the end of the braid 46 are connected and fixed by adopting a method of crimping well-known shield rings (as an example).

The tube connecting parts 48 are formed and arranged at the ends of the braids 46 as parts which contact one end and the other end of the conductive shrinkable tube 45 which shrinks. In the embodiment, the tube connecting parts 48 are formed by folding the ends of the braids 46 to become thicker. However, this may be an example. As long as contact with the conductive shrinkable tube 45 is possible, the tube connecting parts shall not be particularly limited.

In the above construction and structure, since the wire harness 41 includes the exterior shielding member 43, which is formed of the conductive shrinkable tube 45, as an exterior member and as a shielding member, it is not necessary to separately provide an exclusive shielding member at the place where the exterior shielding member 43 is disposed. As a result, the cost can be lowered by suppressing the increase of the number of components related to the electromagnetic shielding.

Further, because the ratio of the braids 46 to the wire harness 41 becomes less than that of the embodiment 1, the wire harness 41 can be light weighted.

It is needless to say that the same effects as the embodiment 1 are achieved for the wire harness 41.

Embodiment 3

Figure 6:
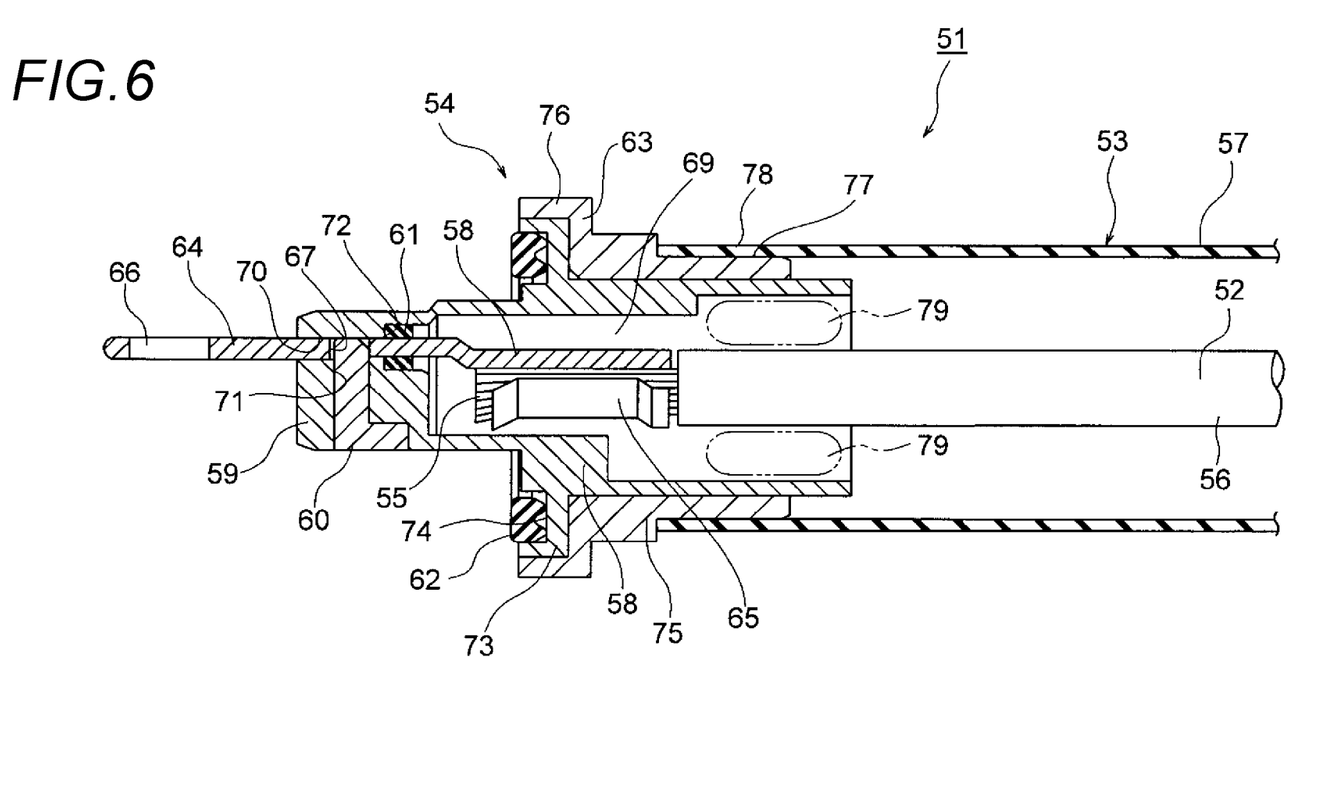
FIG. 6 is a schematic sectional view which shows a further example of a wire harness according to an embodiment 3 of the present invention.

Next, an embodiment 3 is described with reference to the figures. FIG. 6 is a schematic sectional view which shows a further example of the wire harness according to the embodiment 3 of the present invention.

In FIG. 6, a wire harness 51 includes two electric wires 52 (conducting paths, herein only one electric wire is shown), an exterior shielding member 53 (exterior member and shielding member), an inverter side connecting member 54 (connecting member) which is provided at one end side of the high voltage electric wires 52, and a battery side connecting member (connecting member) which is not shown and which is provided at the other side. The battery side connecting member not shown in the figure is basically constructed like the inverter side connecting member 54.

The high voltage electric wire 52 includes a conductor 55 and an insulator 56 which covers the conductor 55. The high voltage electric wire 52 is processed so that the conductor 55 is exposed by only stripping a predetermined length of the insulator 56 at a terminal of the high voltage electric wire 52. Herein, a conductor structure formed by twisting strands (strands of copper, copper alloy, aluminum or aluminum alloy) is used as the conductor 55. The conductor 55 is formed into a shape whose section is generally circular (round), but should not be particularly limited. The conductor 55 may have a rod-like conductor structure whose section is a rectangular or circular shape (for example, conductor structure of a single rectangular core or a single round core). The conductor 55 may have a conductor structure formed of, for example, weaved bus bars.

The insulator 56 is formed by extruding resin material that has the property of insulating and coating the resin material on the outside of the conductor 55, and what is well-known is used herein.

Because the high voltage electric wire 52 is a high voltage electric wire, the high voltage electric wire 52 is formed to be thick.

The exterior shielding member 53 is formed of a shrinkable tube which has conductivity, that is, a conductive shrinkable tube 57, and when the conductive shrinkable tube 57 shrinks, bent parts (refer to the bent parts 29 of the embodiment 1) which conform to the wiring path of the wire harness 51 are formed. When the bent parts are formed due to the shrink, the exterior shielding member 53 makes it possible to maintain the shape of the above wiring path.

The conductive shrinkable tube 57 is formed into a straight pipe shape before the shrink. The inside diameter of the conductive shrinkable tube 57 is set so that the two high voltage electric wires 52, and predetermined parts of the inverter side connecting member 54 and the battery side connecting member which is not shown can be easily inserted. The inside diameter of the conductive shrinkable tube 57 after the shrink is set so that the two high voltage electric wires 52 are not pressed. The inside diameter of the conductive shrinkable tube 57 after the shrink is set so that the conductive shrinkable tube 57 contacts with and electrically connects to the above predetermined parts, and the conductive shrinkable tube 57 adheres to the above predetermined parts to become a watertight state.

What is similar to the conductive shrinkable tube 45 (refer to FIG. 5) of the embodiment 2 is used as the conductive shrinkable tube 57. That is, a conductive heat shrinkable tube which shrinks when heat is applied is used.

The inverter side connecting member 54 is a so-called connector, is inserted into the shield casing 27 (refer to FIG. 2) of the inverter unit 4 (refer to FIGS. 1 and 2), and has a structure suitable for electrical connection to be accomplished in the inside. The inverter side connecting member 54 includes a terminal metal fitting 58, a housing 59, a terminal locking member 60, sealing members 61 and 62, a shield shell 63 and a bolt which is not shown and which is used to fix the shield shell 63.

The terminal metal fitting 58 is formed by forging a metal plate that has conductivity. Herein, a male model is used as the terminal metal fitting 58. The terminal metal fitting 58 has an electrical contact part 64 and an electrical wire connecting part 65 which is integrally connected to the electrical contact part 64.

The electrical contact part 64 is formed to a tab shape. A first through hole 66 and a second through hole 67 are formed in the electrical contact part 64. The first through hole 66 is formed as a part used for electrical connection inside the inverter unit 4 (refer to FIGS. 1 and 2). On the other hand, the second through hole 67 is formed as a part which is locked by the terminal locking member 60.

The electric wire connecting part 65 is formed so that the conductor 55 of the high voltage electric wire 52 can be connected and fixed. In the embodiment, the electric wire connecting part 65 is formed to a barrel shape so that it is possible to press bond and connect the conductor 55 by crimping (Regarding the connection, welding or the like is also possible.).

The housing 59 is a resin molded article which has the property of insulating (insulative member), has a housing body 68, and is formed to a shape shown in the figure. The shape shall be one example.

A terminal accommodating room 69 is formed inside the housing body 68. The terminal accommodating room 69 is formed so that the electric wire connecting part 65 of the terminal metal fitting 58 which is connected and fixed to the conductor 55 of the high voltage electric wire 52 is mainly accommodated. An electrical contact part derivation hole 70 which penetrates towards the front end of the housing is formed in the terminal accommodating room 69.

The electrical contact part 65 is protruded from the front end of the housing through the electrical contact part derivation hole 70 when the terminal metal fitting 58 is accommodated in the terminal accommodating room 69.

A terminal locking member accommodating hole 71 which communicates with the electrical contact part derivation hole 70 is formed in the housing body 68 from the lower part towards the upper part. The second through hole 67 is locked by the terminal locking member 60 that is fitted in the terminal locking member accommodating hole 71, and thereby it becomes impossible to pull out the terminal metal fitting 58.

A sealing member accommodating hole 72 is formed at a connecting part of the terminal accommodating room 69 and the electrical contact part derivation hole 70. The sealing member 61 which is accommodated in the sealing member accommodating hole 72 contacts with the electrical contact part 64 in a water tight way. The sealing member 61 is arbitrarily provided (because the exterior shielding member 53 functions as a watertight structure, which will be described below).

A flange part 73 is formed at the outside of the housing body 68. A sealing member accommodating groove 74 is formed in the flange part 73. A sealing member 62, which is accommodated in the sealing member accommodating groove 74, contacts with the shield casing 27 (refer to FIG. 2) of the inverter unit 4 (refer to FIGS. 1 and 2) in a water tight way.

The shield shell 63 is a so-called metal or conductive resin molded article, and has a pipe-like shell body 75 and a shell fixing part 76 as a part to fix to the shield casing 27 (refer to FIG. 2). A watertight part 77 where the end of the shell body 75 is adhered due to the shrink of the exterior shielding member 53 which is formed of the conductive shrinkable tube 57 is formed at the outer surface of the shell body 75. A reference number 78 shows a watertight part of the exterior shielding member 53.

In the above construction and structure, a space 79 behind the terminal accommodating room 69 is originally used as a part to assemble the sealing member which seals the high voltage electric wires 52 and the housing 59 or the rear holder which presses the sealing member. However, because the exterior shielding member 53 adheres to become a water tight state in the present example, that is, because the exterior shielding member 53 functions as a water tight structure, the space 79 becomes unnecessary. That is, because the wire harness 51 makes the exterior shielding member 53 adhere to a predetermined position of the inverter side connecting member 54, the number of components can be reduced in terms of the sealing member or the rear holder. Therefore, the cost can be lowered.

It is needless to say that the same effects as the embodiments 1 and 2 are achieved for the wire harness 51.

Embodiment 4

Figure 7:
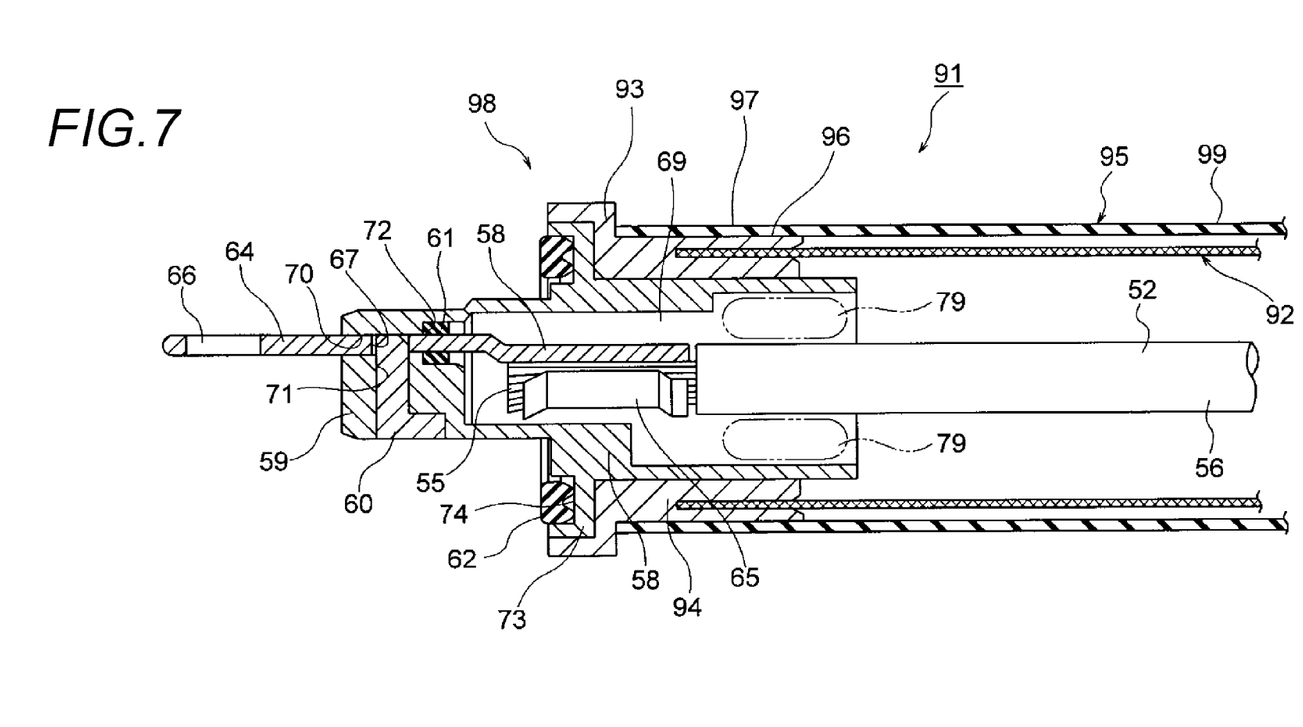
FIG. 7 is a schematic sectional view which shows a further example of a wire harness according to an embodiment 4 of the present invention.

Next, an embodiment 4 is described with reference to the figures. FIG. 7 is a schematic sectional view which shows a further example of the wire harness according to the embodiment 4 of the present invention. Furthermore, the components that are identical with those in the above-mentioned embodiment 3 are given identical numbers, and their detailed description is omitted.

In FIG. 7, a wire harness 91 of the embodiment 4 is a variation of the wire harness 51 (refer to FIG. 6) of the embodiment 3, and the following points are different. That is, the point that a shielding member 92 is unified (insert molded herein) to a pipe-like shell body 94 of a shield shell 93, and the point that an exterior member 95 is disposed on the outer surface of the shell body 94 to adhere to the shell body 94 are different.

Reference numbers 96 and 97 show watertight parts. A reference number 98 shows an inverter side connecting member (connecting member). A reference number 99 shows a shrinkable tube.

The shielding member 92 is similar to the shielding member 20 (refer to FIGS. 1 to 4) of the embodiment 1. The exterior member 95 is similar to the exterior member 21 (refer to FIGS. 1 to 4) of the embodiment 1.

Therefore, it is needless to say that the same effects as the embodiments 1 to 3 are achieved for the wire harness 91.

In addition, it is apparent that various modifications can be made to the invention without changing the purpose of the invention.

In the above description, the exterior member is formed in a long state, but the exterior member shall not be limited to this. That is, the exterior member may be formed in a relatively short state so that only the bent part of the wire harness can be disposed and there are one or more such exterior members.

According to the wire harness described above, a shrinkable tube is used as an exterior member which accommodates one or more conducting paths. Thus, it is possible to bend the wire harness and a desired shape of the wire harness can be maintained, the cost can be lowered without complicating the structure of a protector.

What is claimed is:

1. A wire harness, comprising:
   one or more conducting paths;
   a tubular shielding member with which the one or more conducting paths are collectively covered;
   a pipe-like exterior member which accommodates the one or more conducting paths and the shielding member; and
   a connecting member Which is provided at a terminal position of the one or more conducting paths, wherein
   the exterior member is formed of a shrinkable tube, into which the shielding member is inserted before shrinking, and having a bent part formed in conformity with a wiring path of the one or more conducting paths during a shrinking of the shrinkable tube, and the bent part maintains a bent shape of the wiring path of the one or more conducting paths after the shrinking of the shrinkable tube,
   wherein the exterior member which is formed of the shrinkable tube has a conductivity to serve as a shielding member,
   wherein the shrinkable tube has a watertight part which adheres on an outer surface of the connecting member with the shrinking of the shrinkable tube.

2. The wire harness according to claim 1,
   wherein the shrinkable tube is configured to be in a bent configuration when undergoing uniform heat application to cause shrinkage of the shrinkable tube.

3. The wire harness according to claim 1,
   wherein the exterior member does not press on the one or more conducting paths and the shielding member after shrinking.

4. The wire harness according to claim 1,
   wherein an inner diameter of the exterior member is greater than a diameter of a bundle of the one or more conducting paths.

5. The wire harness according to claim 1,
   wherein an inner diameter of the shielding member is greater than a diameter of a bundle of the one or more conducting paths.

* * * * *